US012571729B2

(12) United States Patent
Maestle et al.

(10) Patent No.: US 12,571,729 B2
(45) Date of Patent: Mar. 10, 2026

(54) APPARATUS FOR TRANSMITTING AND/OR RECEIVING TERAHERTZ RADIATION, AND CONTROL DEVICE THEREFOR

(71) Applicant: Helmut Fischer GmbH Institut fuer Elektronik und Messtechnik, Sindelfingen (DE)

(72) Inventors: Ruediger Maestle, Boeblingen (DE); Sébastien Heini, Urmatt (FR)

(73) Assignee: HELMUT FISCHER GMBH INSTITUT FUER ELEKTRONIK UND MESSTECHNIK, Sindelfingen (DE)

( * ) Notice: Subject to any disclaimer, the term of this patent is extended or adjusted under 35 U.S.C. 154(b) by 429 days.

(21) Appl. No.: 17/925,153

(22) PCT Filed: May 5, 2021

(86) PCT No.: PCT/EP2021/061794
§ 371 (c)(1),
(2) Date: Nov. 14, 2022

(87) PCT Pub. No.: WO2021/228640
PCT Pub. Date: Nov. 18, 2021

(65) Prior Publication Data
US 2023/0175960 A1     Jun. 8, 2023

(30) Foreign Application Priority Data
May 15, 2020    (DE) .......................... 102020113306.5

(51) Int. Cl.
*G01N 21/3581* (2014.01)

(52) U.S. Cl.
CPC ................................ *G01N 21/3581* (2013.01)

(58) Field of Classification Search
None
See application file for complete search history.

(56) References Cited

U.S. PATENT DOCUMENTS

| | | | | | |
|---|---|---|---|---|---|
| 5,379,309 | A | * | 1/1995 | Logan, Jr. ............. | H01S 5/4006 |
| | | | | | 372/18 |
| 5,623,145 | A | * | 4/1997 | Nuss .................. | G01N 21/3586 |
| | | | | | 250/341.1 |

(Continued)

FOREIGN PATENT DOCUMENTS

| | | |
|---|---|---|
| DE | 102007011704 A1 | 9/2008 |
| DE | 102014009167 A1 | 12/2015 |

(Continued)

OTHER PUBLICATIONS

International Search Report mailed Sep. 23, 2021 in PCT Application No. PCT/EP2021/061794.

(Continued)

*Primary Examiner* — David J Makiya
*Assistant Examiner* — Djura Malevic
(74) *Attorney, Agent, or Firm* — KRIEGSMAN & KRIEGSMAN

(57) ABSTRACT

The invention relates to a terahertz (THz) apparatus for transmitting and/or receiving THz radiation, comprising at least one THz element, which is designed to transmit and/or receive THz radiation, and a digital data processing device, wherein in particular the digital data processing device is designed to at least temporarily process a first signal of at least one component of the apparatus.

26 Claims, 9 Drawing Sheets

(56)                References Cited

U.S. PATENT DOCUMENTS

Figure 1:
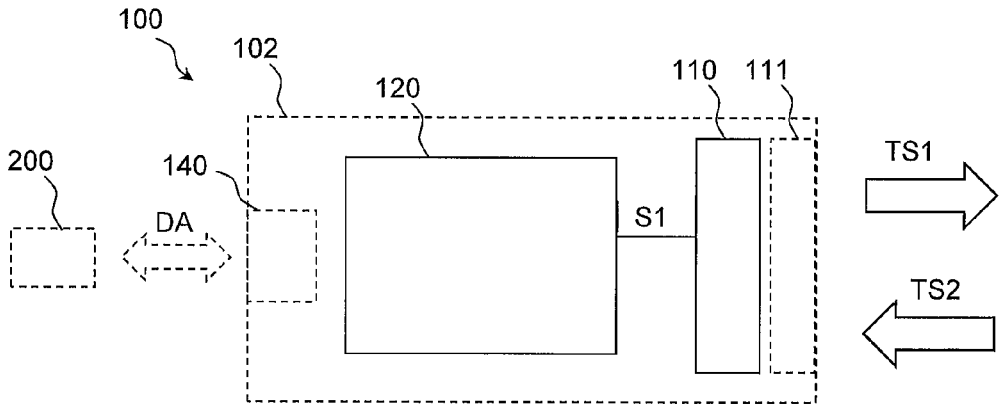

| | | | |
|---|---|---|---|
| 7,307,258 B2 * | 12/2007 | Tao | G01N 21/4738 |
| | | | 250/341.1 |
| 9,400,214 B1 * | 7/2016 | Demers | G01J 3/10 |
| 10,833,723 B2 * | 11/2020 | Hur | H04L 5/1461 |
| 2004/0130725 A1 * | 7/2004 | Kido | G01N 21/3581 |
| | | | 356/484 |
| 2005/0046584 A1 * | 3/2005 | Breed | B60N 2/02246 |
| | | | 340/13.31 |
| 2007/0158571 A1 | 7/2007 | Cole et al. | |
| 2007/0267574 A1 * | 11/2007 | Krug | G01J 9/04 |
| | | | 250/341.1 |
| 2008/0006767 A1 * | 1/2008 | Taday | G01N 21/3586 |
| | | | 250/252.1 |
| 2008/0179527 A1 * | 7/2008 | Demers | G01N 21/3581 |
| | | | 250/341.1 |
| 2008/0179528 A1 * | 7/2008 | Demers | G01J 3/42 |
| | | | 250/341.1 |
| 2008/0212974 A1 * | 9/2008 | Davies | H04B 10/2575 |
| | | | 398/140 |
| 2009/0057559 A1 * | 3/2009 | Koyama | G01J 3/02 |
| | | | 250/340 |
| 2009/0065696 A1 * | 3/2009 | Mann | H04B 1/40 |
| | | | 250/339.02 |
| 2009/0180122 A1 * | 7/2009 | Federici | G01J 3/453 |
| | | | 356/451 |
| 2009/0200472 A1 * | 8/2009 | Gregory | G01N 21/3581 |
| | | | 250/341.7 |
| 2011/0079720 A1 * | 4/2011 | Heidari | G01J 3/42 |
| | | | 250/340 |
| 2012/0305772 A1 * | 12/2012 | Tripodi | G01N 21/553 |
| | | | 250/338.4 |

| | | | |
|---|---|---|---|
| 2013/0320216 A1 | 12/2013 | Aiko et al. | |
| 2014/0198195 A1 * | 7/2014 | Jun | H04N 23/45 |
| | | | 348/77 |
| 2014/0332687 A1 * | 11/2014 | Yamana | G01N 21/3586 |
| | | | 250/353 |
| 2015/0008324 A1 * | 1/2015 | Itsuji | G01N 21/47 |
| | | | 250/341.8 |
| 2015/0014535 A1 * | 1/2015 | Bushmaker | G01J 3/42 |
| | | | 250/340 |
| 2015/0201137 A1 * | 7/2015 | Lee | G01J 3/42 |
| | | | 348/164 |
| 2016/0377958 A1 | 12/2016 | Ouchi | |
| 2017/0050208 A1 * | 2/2017 | Nichols | B25J 9/1679 |
| 2017/0102231 A1 * | 4/2017 | Yahng | G02B 13/0005 |
| 2018/0279024 A1 * | 9/2018 | Jiang | H04Q 11/00 |
| 2019/0317315 A1 * | 10/2019 | Wang | G01N 21/3586 |
| 2020/0333431 A1 * | 10/2020 | Völkel | G01S 13/426 |
| 2020/0380226 A1 * | 12/2020 | Rodriguez | G06V 10/147 |
| 2022/0393781 A1 * | 12/2022 | Kim | G06N 3/08 |
| 2023/0175960 A1 * | 6/2023 | Maestle | G01B 21/045 |
| | | | 250/340 |

FOREIGN PATENT DOCUMENTS

| | | | | | |
|---|---|---|---|---|---|
| EP | 2722639 | A1 * | 4/2014 | | G01B 11/0625 |
| JP | 2015099379 | A | 5/2015 | | |
| KR | 20160149429 | A | 12/2016 | | |
| WO | 2009149735 | A1 | 12/2009 | | |

OTHER PUBLICATIONS

Written Opinion mailed Sep. 23, 2021 in PCT Application No. PCT/EP2021/061794.

\* cited by examiner

350

352

360

362

400

402

404

406

408

APPARATUS FOR TRANSMITTING AND/OR RECEIVING TERAHERTZ RADIATION, AND CONTROL DEVICE THEREFOR

The disclosure relates to an apparatus for transmitting and/or receiving terahertz, THz, radiation, also referred to as "THz apparatus" hereinafter.

The disclosure also relates to a control device for at least temporarily controlling the operation of at least one THz apparatus.

Preferred embodiments relate to a terahertz, THz, apparatus for transmitting and/or receiving THz radiation, comprising at least one THz element which is designed to transmit and/or receive the THz radiation, and a digital data processing device, wherein in particular the digital data processing device is designed to process at least temporarily at least one first signal of at least one component of the apparatus. As a result, the at least one first signal can already be processed in the THz apparatus.

Provision is made in further preferred embodiments that the at least one THz element is designed to detect at least one THz signal and to output an, in particular electrical, output signal, which characterises the detected THz signal, wherein the THz apparatus has a digitisation stage which is designed to transform the output signal of the at least one THz element into a first digital signal. By way of example, this first digital signal can be processed by means of the digital data processing device.

Provision is made in further preferred embodiments that the digitisation stage has an analogue-to-digital converter and, optionally, at least one amplifier, in particular a transimpedance amplifier.

Provision is made in further preferred embodiments that the digital data processing device has at least one of the following elements: a) microprocessor, b) microcontroller, c) programmable logic module, in particular FPGA, d) digital signal processor, DSP, e) graphics processor, GPU, f) application-specific integrated circuit, ASIC.

In further preferred embodiments, the THz radiation has a frequency range between 0.1 THz and 10 THz, in particular between 3 THz and 10 THz, further in particular between 4.5 THz and 6.5 THz.

In further preferred embodiments, the apparatus has a housing, wherein in particular at least one component of the apparatus, further in particular a plurality of components, particularly preferably all of the components of the apparatus are arranged in and/or on the housing. This enables provision of a measuring head that can be used flexibly for THz radiation. In further preferred embodiments, THz optics which can preferably likewise be integrated into the optional housing are assigned to the at least one THz element.

Provision is made in further preferred embodiments that the digital data processing device is designed to control an operation of the THz apparatus or of at least one component of the THz apparatus at least temporarily.

Provision is made in further preferred embodiments that the digital data processing device and/or the THz apparatus can be controlled at least temporarily by at least one external unit.

Provision is made in further preferred embodiments that the digital data processing device and/or the THz apparatus can be operated autonomously at least temporarily, therefore, in particular, without the need for (e.g. constant) control by an external unit, for example.

Provision is made in further preferred embodiments that the THz apparatus and/or the digital data processing device has at least one memory device for at least temporarily storing computer programs and/or data, wherein in particular the data have at least one of the following elements: a) calibration data, in particular for at least one component of the THz apparatus, b) model data characterising at least one component of the apparatus or at least one model for a component of the THz apparatus, c) data of reference measurements, d) data characterising at least a part of the THz signals that are received and/or to be transmitted.

In further preferred embodiments, reference measurements are performed, e.g. measurements in one or more spatial arrangements of the THz apparatus relative to a reference unit (e.g. reference measurements using a (known) reference measurement object). The reference measurements are preferably carried out at the source/focal point of the THz radiation.

Provision is made in further preferred embodiments that the digital data processing device is designed to carry out at least one of the following processes at least temporarily: a) background correction, b) pulse pileup correction, c) filtering, in particular pre-filtering, d) averaging, e) correction of THz data with reference measurements, f) providing a time-domain signal and/or frequency-domain signal, g) data, in particular characterising at least a part of the THz signals that are received and/or to be transmitted.

In further preferred embodiments, the background correction comprises at least one of the following elements: a) carrying out at least one measurement by means of the THz apparatus without a measurement object, b) determining a measurement signal, e.g. in the time domain, c) storing the measurement signal, at least temporarily, in particular in the digital data processing device and/or in a memory which the digital data processing device can access, d) carrying out further measurements, e.g. reference measurements using a (known) reference measurement object and/or sample measurements using a measurement object, e) processing the further measurements on the basis of the measurement signal, in particular deducting the measurement signal from the further measurements.

Provision is made in further preferred embodiments that the THz apparatus has at least one first, in particular digital, interface, in particular for a, preferably bidirectional, data exchange with at least one external unit, wherein in particular the first interface is wired or wireless.

Provision is made in further preferred embodiments that the THz apparatus and/or at least one component of the THz apparatus is designed to transmit and/or receive at least one of the following signals via the first interface: a) clock signal, in particular for synchronisation with at least one external unit or the at least one external unit, b) trigger signal, c) data signal, in particular characterising at least a part of the THz signals that are received and/or to be transmitted, d) measurement data of a device for determining aa) a position of the THz apparatus in space and/or bb) a form of a measurement object and/or cc) a distance between the THz apparatus and a or the measurement object.

In further preferred embodiments, the first interface is designed for bidirectional real-time communication.

Provision is made in further preferred embodiments that the THz apparatus has at least one second interface for the at least temporary, in particular electrical, energy supply of the THz apparatus or at least one component of the THz apparatus.

Provision is made in further preferred embodiments that the THz apparatus has at least one third, in particular optical, interface for at least temporarily receiving optical radiation, in particular pulsed laser radiation, in particular from at least one external unit.

Provision is made in further preferred embodiments that the THz apparatus is designed to receive at least two laser signals, that are at least temporarily different, via the third interface.

Provision is made in further preferred embodiments that the THz apparatus has at least one device for determining a) a position of the THz apparatus in space and/or b) a form of a measurement object and/or c) a distance between the THz apparatus and a or the measurement object.

Provision is made in further preferred embodiments that the THz apparatus is designed to provide a protective gas flow having a protective gas in at least one region of a beam path of the THz radiation, wherein in particular the protective gas has at least one of the following elements or is formed from at least one of the following elements: a) dry air, b) dry gas, c) dry gas mixture, d) at least one gas which has no absorption line in a frequency range of the THz radiation, wherein in particular the protective gas has a dew point temperature of −20 degrees Celsius or less, preferably of −30 degrees Celsius or less, more preferably of −40 degrees Celsius or less, wherein in particular the protective gas causes attenuation of the THz radiation along the beam path of 0.1 dB or less, preferably for each frequency of the THz radiation.

Provision is made in further preferred embodiments that the THz apparatus further has: a) at least one supply device for at least temporarily providing the protective gas flow, and/or b) at least one pressure influencing member for influencing a pressure of the protective gas.

Provision is made in further preferred embodiments that the THz apparatus further has: at least one nozzle, wherein in particular the nozzle is designed and/or arranged to guide the protective gas flow or at least a part of the protective gas flow into the at least one region of the beam path of the THz radiation, wherein in particular the at least one nozzle is a free jet nozzle.

Provision is made in further preferred embodiments that the THz apparatus has at least one positioning unit which is designed to move the THz apparatus at least temporarily a) relative to a or the measurement object and/or b) relative to a target system in which the THz apparatus is arranged. In further preferred embodiments, the at least one positioning unit can have, for example, at least one robot.

Provision is made in further preferred embodiments that the THz apparatus is designed to carry out a closed-loop positioning (i.e. in particular a controlled positioning in the sense of a closed control loop), in particular based on data of a or the device for determining aa) a position of the THz apparatus in space and/or bb) a form of a measurement object and/or cc) a distance between the THz apparatus and a or the measurement object.

In further preferred embodiments, the data of the device for determining aa) a position of the THz apparatus in space and/or bb) a form of a measurement object and/or cc) a distance between the THz apparatus and a or the measurement object can for example be used based on this, e.g. with a certain tolerance, to bring a relative position of the measurement object into an area for which there is reference data, e.g. a source or the focal point of the THz radiation.

Further preferred embodiments relate to a control device for at least temporarily controlling the operation of at least one THz apparatus for transmitting and/or receiving terahertz, THz, radiation, wherein in particular the at least one THz apparatus is designed according to preferred embodiments, wherein the control device has at least one first, in particular digital, interface for, in particular bidirectional, data exchange with at least a or the THz apparatus, wherein in particular the first interface is wired is wireless.

In further preferred embodiments, the first interface of the control device is designed for bidirectional real-time communication.

Provision is made in further preferred embodiments that the control device is designed to control operation of a plurality of THz apparatuses simultaneously and/or at least partially temporally overlapping and/or in time multiplex.

Provision is made in further preferred embodiments that the control device is designed to transmit and/or receive at least one of the following signals via the first interface: a) clock signal, b) trigger signal, c) data signal, in particular characterising at least a part of the THz signals received and/or to be transmitted, d) measurement data of a or the device for determining aa) a position of the THz apparatus in space and/or bb) a form of a measurement object and/or cc) a distance between the THz apparatus and a or the measurement object.

Provision is made in further preferred embodiments that the control device has at least one second interface which is an optical interface, in particular for at least temporarily outputting first pulsed laser radiation and/or second pulsed laser radiation to the at least one THz apparatus.

Provision is made in further preferred embodiments that the control device has at least one laser device for generating the first pulsed laser radiation with a first pulse frequency and for generating the second pulsed laser radiation with a second pulse frequency, wherein in particular the second pulse frequency is at least temporarily different from the first pulse frequency.

Provision is made in further preferred embodiments that the at least one laser device has at least one, preferably two, pulsed laser sources, in particular femtosecond, fs, pulsed laser sources.

Provision is made in further preferred embodiments that the control device is designed to output at least temporarily the first pulsed laser radiation and/or the second pulsed laser radiation to a plurality of THz apparatuses, in particular simultaneously or at least partially temporally overlapping or in time multiplex.

Provision is made in further preferred embodiments that the control device has at least one optical beam splitter and/or optical switch, in particular to supply one or a plurality of THz apparatuses selectively with the first pulsed laser radiation and/or the second pulsed laser radiation.

Provision is made in further preferred embodiments that the optical beam splitter and/or optical switch is wavelength-neutral.

Provision is made in further preferred embodiments that the optical beam splitter and/or the optical switch has a maximum attenuation of 1.0 dB, in particular 0.2 dB in a wavelength range between 1450 nm (nanometres) and 1650 nm, more particularly in a wavelength range between 1500 nm and 1600 nm.

Provision is made in further preferred embodiments that the optical beam splitter and/or the optical switch is/are designed so that at least 80 percent, in particular 90 percent, of the total power of the (first and/or second pulsed) laser radiation is transmitted in a wavelength range of +/−100 nm, around a central wavelength (in particular between +/−50 nm with respect to the central wavelength) of the laser radiation.

Provision is made in further preferred embodiments that a plurality of fibre optics devices are provided to supply a plurality of THz apparatuses with the first pulsed laser radiation and/or the second pulsed laser radiation.

Provision is made in further preferred embodiments that some, preferably each, of the plurality of light guide devices are dispersion-matched and/or length-matched to a maximum optical path length difference of +/−6 cm, in particular +/−3 cm. Particularly efficient operation with respect to the THz signals is thereby made possible.

Provision is made in further preferred embodiments that the at least one laser device has at least one, preferably two, continuous wave (CW) laser sources or quasi-continuous-wave (QCW) laser sources.

Provision is made in further preferred embodiments that the control device has at least one third interface for the at least temporary electrical energy supply of at least one component of the at least one THz apparatus.

Provision is made in further preferred embodiments that the control device has at least one fourth interface for, in particular bidirectional, data exchange with at least one external component, for example a control computer.

Provision is made in further preferred embodiments that the control device has at least one digital signal processing device (e.g. a DSP), wherein in particular the at least one digital signal processing device is designed to process at least one signal received by the at least one THz apparatus.

Further preferred embodiments relate to a system having at least one THz apparatus according to the embodiments and having at least one control device according to the embodiments.

Further preferred embodiments relate to a method for operating a terahertz, THz, apparatus for transmitting and/or receiving terahertz, THz, radiation, having at least one THz element, which is designed to transmit and/or receive the THz radiation, and a digital data processing device, wherein the digital data processing device processes at least temporarily at least one first signal of at least one component of the THz apparatus.

Further preferred embodiments relate to a method for operating a control device for at least temporarily controlling the operation of at least one THz apparatus for transmitting and/or receiving terahertz, THz, radiation wherein in particular the at least one THz apparatus is designed according to the embodiments, wherein the control device has at least one first, in particular digital, interface for, in particular bidirectional, data exchange with at least a or the THz apparatus, wherein in particular the first interface is wired or wireless, and wherein the control device exchanges data at least temporarily with the at least one THz apparatus, preferably with a plurality of THz apparatuses, in particular to control the at least one THz apparatus or the plurality of THz apparatuses.

Further preferred embodiments relate to the use of the THz apparatus according to the embodiments and/or of the control device according to the embodiments and/or of the system according to the embodiments and/or of the method according to the embodiments for at least one of the following aspects: a) carrying out a plurality of THz measurements in simultaneous and/or temporally offset and/or temporally alternating fashion, in particular with respect to at least one measurement object, b) carrying out a signal processing or pre-processing of signals associated with at least one THz signal, in particular by at least one THz apparatus and/or by the at least one control device, c) centrally controlling a plurality of THz apparatuses by means of the at least one control device, d) positioning a plurality of THz apparatuses under the control of the at least one control device, in particular by means of at least one positioning unit, e) carrying out closed-loop positioning, in particular based on data of an or the device for determining aa) a position of the THz apparatus in space and/or bb) a form of a measurement object and/or cc) a distance between the THz apparatus and a or the measurement object.

Further features, possible applications and advantages of preferred embodiments emerge from the following description of exemplary embodiments which are illustrated in the figures of the drawing. In this context, all of the features described or illustrated constitute the subject matter of the invention, individually or in any desired combination, irrespective of their summary in the claims or their back-references and irrespective of their wording or presentation in the description or in the drawing.

Figure 2:
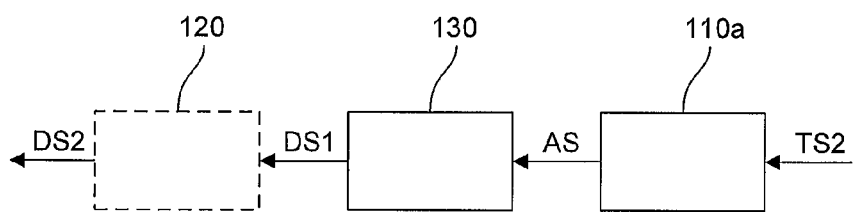
Figure 3:
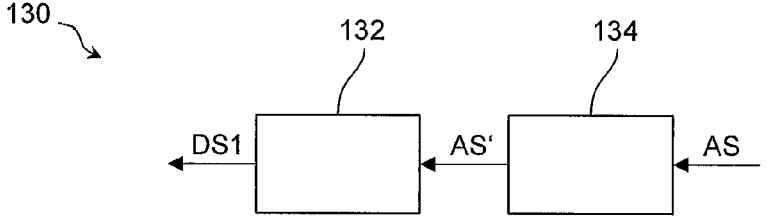
Figure 4:
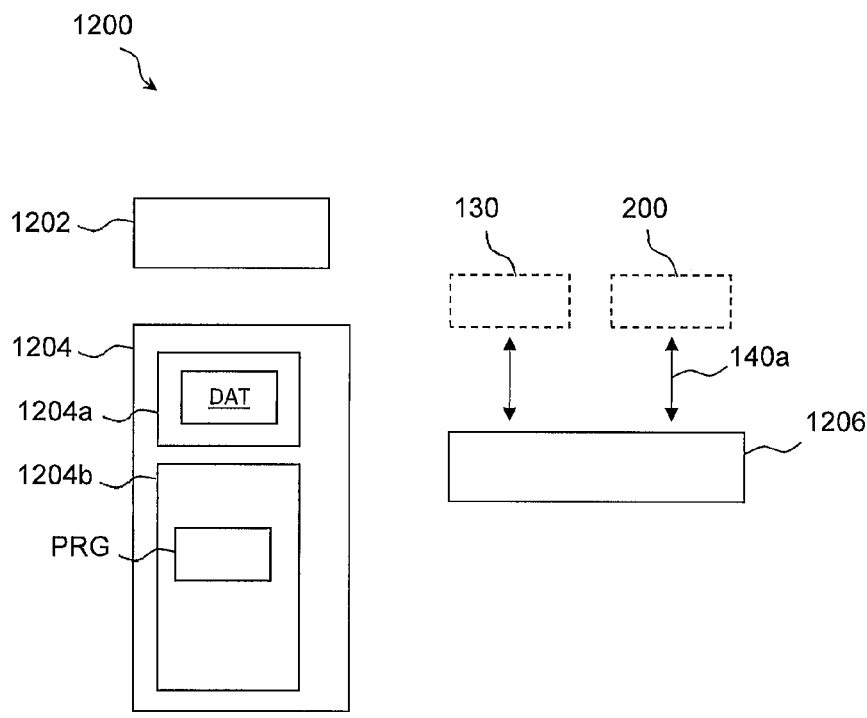
Figure 9:
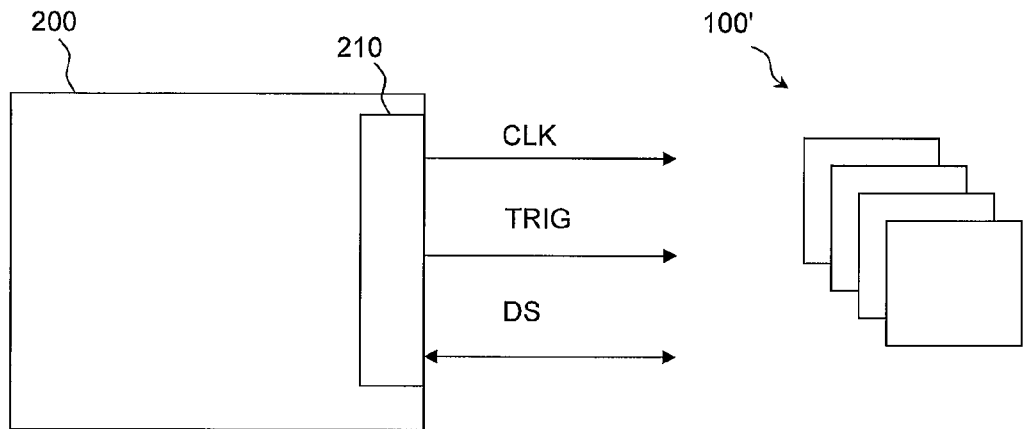
Figures 10, 11:
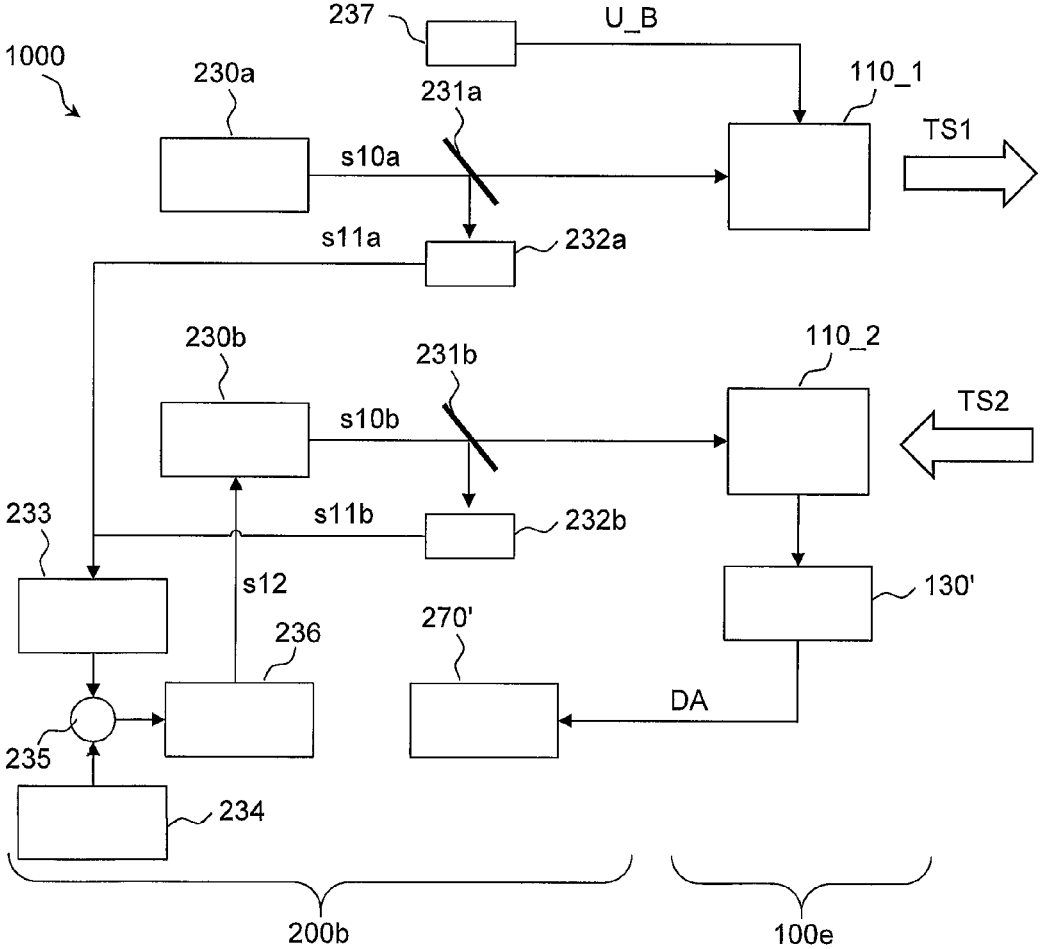
Figure 12:
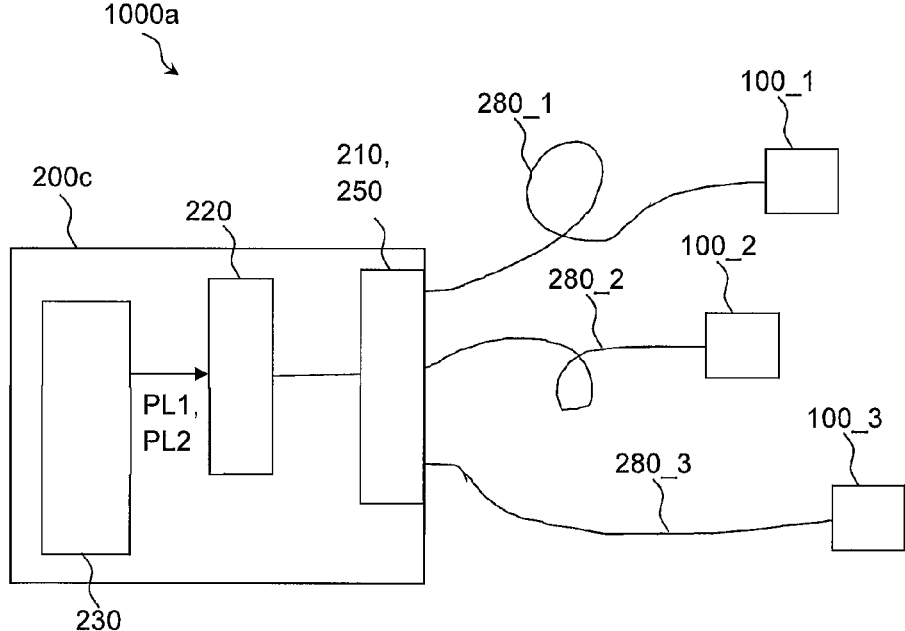
Figure 13A:
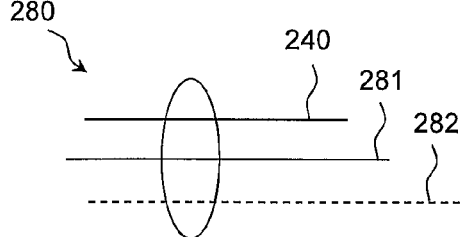
Figure 13B:
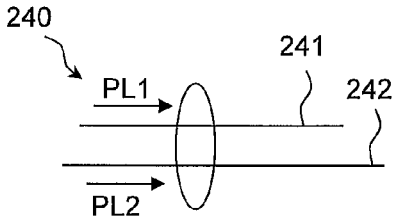
Figure 14:
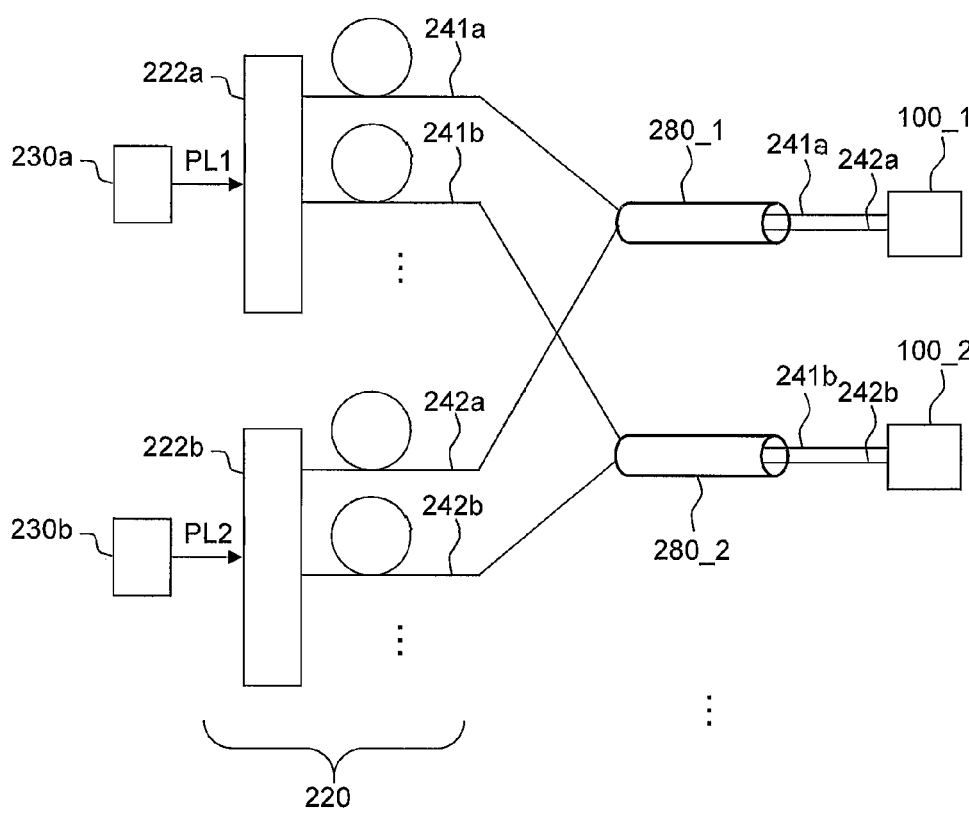
Figure 15:
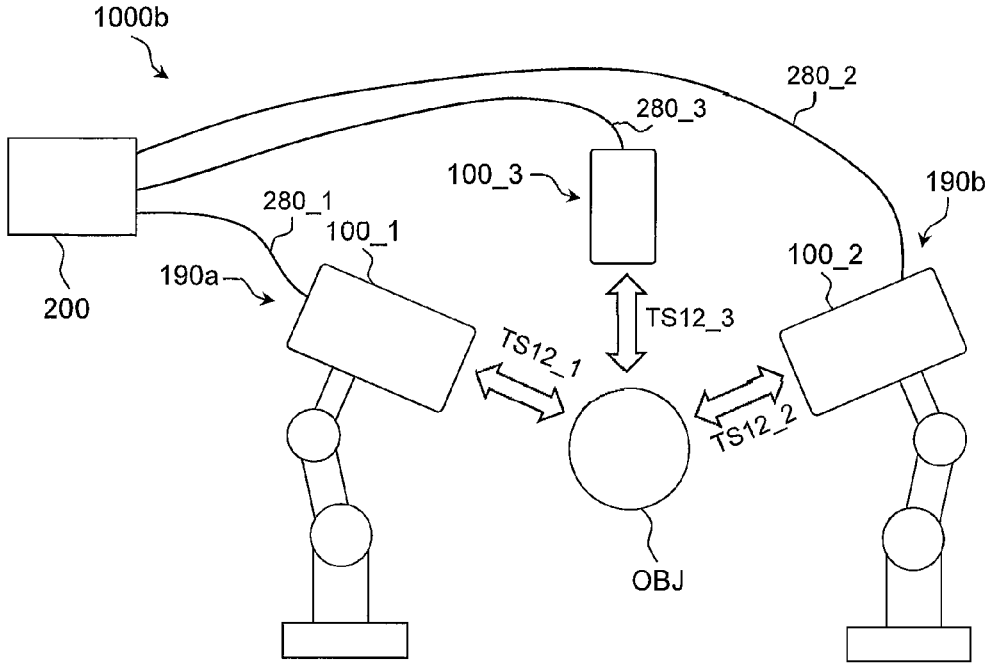
Figures 16, 17, 18:
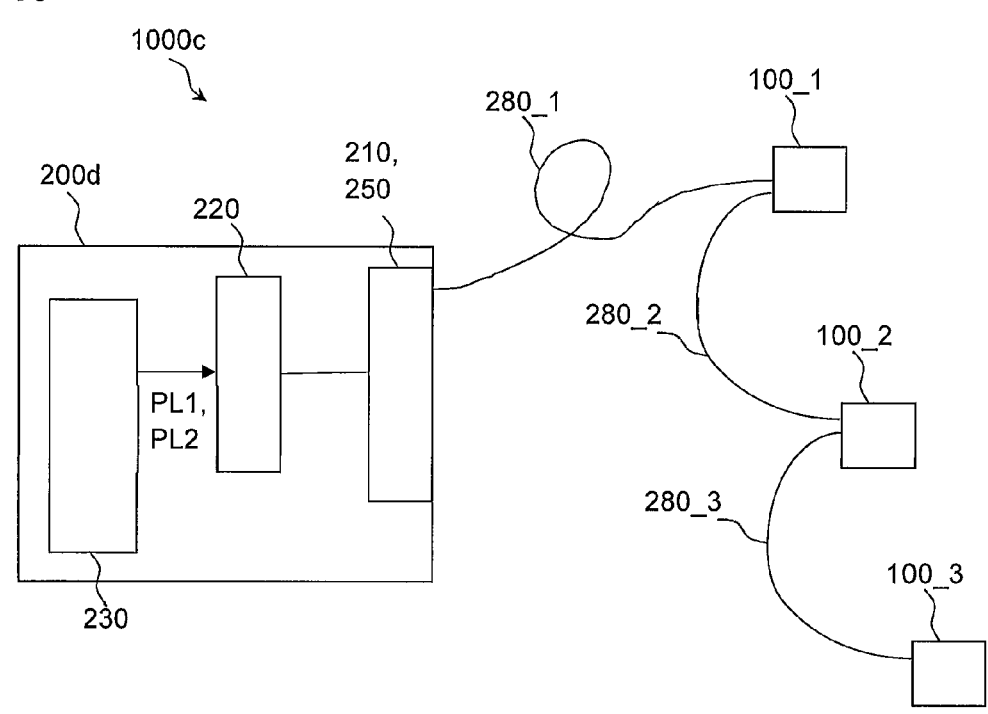
Figures 19, 20, 21:
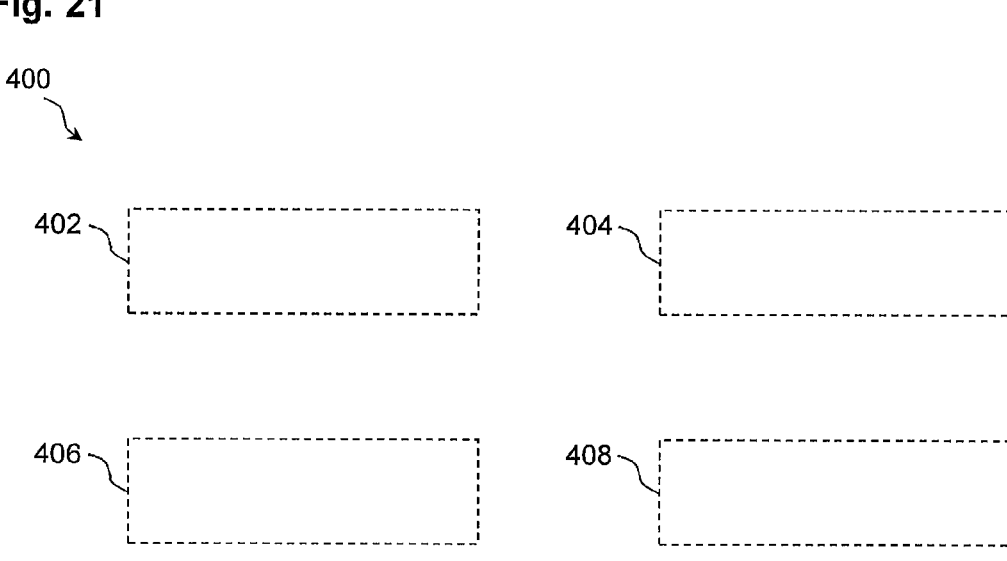

In the drawing:

FIG. 1 schematically shows a block diagram of a THz apparatus as per preferred embodiments, FIG. 2 schematically shows a block diagram of aspects of the THz apparatus as per further preferred embodiments, FIG. 3 schematically shows a block diagram of aspects of the THz apparatus as per further preferred embodiments, FIG. 4 schematically shows a block diagram of a data processing device of the THz apparatus as per further preferred embodiments, FIG. 5, 6, 7, 8 each schematically show a block diagram of the THz apparatus as per further preferred embodiments FIG. 9 schematically shows a block diagram of a control device as per further preferred embodiments, FIG. 10 schematically shows a block diagram of a control device as per further preferred embodiments, FIG. 11 schematically shows a block diagram of a system as per further preferred embodiments, FIG. 12 schematically shows a block diagram of a system as per further preferred embodiments, FIG. 13A schematically shows part of a supply line as per further preferred embodiments, FIG. 13B schematically shows part of a fibre optics device as per further preferred embodiments, FIG. 14 schematically shows a simplified block diagram as per further preferred embodiments, FIG. 15 schematically shows a simplified block diagram of a system as per further preferred embodiments, FIG. 16 schematically shows a simplified block diagram of a system as per further preferred embodiments, FIG. 17 schematically shows a simplified flow chart of a method as per further preferred embodiments, FIG. 18 schematically shows a simplified flow chart of a method as per further preferred embodiments, FIG. 19 schematically shows a simplified flow chart of a method as per further preferred embodiments, FIG. 20 schematically shows a simplified flow chart of a method as per further preferred embodiments, and FIG. 21 schematically shows aspects of the use according to further preferred embodiments.

FIG. 1 schematically shows a block diagram of a THz apparatus 100 as per preferred embodiments. The THz apparatus 100 is designed for transmitting and/or receiving THz radiation TS1, TS2 and has for this purpose at least one THz element 110 which is designed to generate or to transmit the THz radiation TS1 and/or to receive or to detect the THz radiation TS2.

In further preferred embodiments, the THz radiation TS1, TS2 has a frequency range between 0.1 THz and 10 THz, in particular between 3 THz and 10 THz, further particularly between 4.5 THz and 6.5 THz.

In further preferred embodiments, by way of example, the THz apparatus 100 can generate the THz radiation TS1, in particular in the form of pulsed THz radiation TS1, and radiate it onto a measurement object (see below FIG. 6). In further preferred embodiments, the THz apparatus 100 can receive or detect THz radiation TS2 possibly reflected at the measurement object OBJ. Measurements of the time domain reflectometry type are thereby made possible.

In further preferred embodiments, the THz apparatus 100 has an optional housing 102, wherein in particular at least one component 110, 120 of the apparatus 100, further particularly a plurality of components, particularly preferably all of the components of the apparatus, are arranged in and/or on the housing 102. This enables provision of a measuring head 102 that can be used flexibly for THz radiation. In further preferred embodiments, optional THz optics 111, which can preferably likewise be integrated into the optional housing 102, are assigned to the at least one THz element 110.

In some preferred embodiments, the THz element 110 can be designed as a THz transmitter. In further preferred embodiments, the THz element 110 can be designed as a THz receiver or detector. In further preferred embodiments, the THz element 110 can be designed as a THz transceiver.

The THz apparatus 100 further preferably has a digital data processing device 120 which is designed in particular to process at least one first signal S1 of at least one component 110 of the THz apparatus 100 at least temporarily. Signal processing of the at least one first signal S1 can thereby already be carried out in the THz apparatus 100, e.g. before optional forwarding of the signal S1 to an external unit 200.

Provision is made in further preferred embodiments, cf. FIG. 2, that a THz element 110a (which, e.g. is designed comparably to the THz element 110 as per FIG. 1) is designed to detect at least one THz signal TS2 and to output an, in particular electrical, output signal AS (in particular an analogue signal, e.g. value-continuously or time-continuously) characterising the detected THz signal TS2, wherein the THz apparatus 100 (FIG. 1) has a digitisation stage 130 (FIG. 2) which is designed to transform the output signal AS of the at least one THz element 110a into a first digital signal DS1 (value-discretely and time-discretely). By way of example, this first digital signal DS1 can be processed by means of the digital data processing device 120, as a result of which, e.g., a second digital signal DS2 is obtained.

In further preferred embodiments, a functionality comparable to the digitisation stage 130 can also be integrated into the digital data processing device 120 (not shown).

Provision is made in further preferred embodiments, cf. FIG. 3, that the digitisation stage 130 has an analogue-to-digital converter 132 and, optionally, at least one amplifier 134, in particular a transimpedance amplifier (TIA). In further preferred embodiments, the TIA 134 amplifies the output signal AS, as a result of which an amplified signal AS' is obtained, which is transformed into the first digital signal DS1 by means of the analogue-to-digital converter 132 for example.

Provision is made in further preferred embodiments that the THz apparatus 100 (FIG. 1) has at least one first, in particular digital, interface 140, in particular for a, preferably bidirectional, in particular real-time-capable, data exchange DA with at least one optional external unit 200, wherein in particular the first interface 140 is wired (e.g. Ethernet, preferably field bus or other real-time communication systems, e.g. EtherCAT, Profibus) or wireless (e.g. WLAN, (cellular) mobile radio system, in particular in accordance with 4G or 5G or 6G standard). As a result, in further preferred embodiments, an analogue interface or signal connection to the external unit 200 can be dispensed with, at least in so far as data transmission of data characterising THz signals is concerned.

In further preferred embodiments the first data interface 140 is designed to transfer digital data or signals DS1, DS2 (FIG. 2), in particular using digital modulation and/or coding processes.

Provision is made in further preferred embodiments that the digital data processing device 120 (FIG. 1) has at least one of the following elements: a) microprocessor, b) microcontroller, c) programmable logic module, in particular FPGA, d) digital signal processor, DSP, e) graphics processor, GPU, f) application-specific integrated circuit, ASIC.

FIG. 4 shows by way of example a simplified block diagram of one possible configuration 1200 for the digital data processing device 120 as per further preferred embodiments. The digital data processing device 1200 as per FIG. 4 has a computer device 1202 and a memory device 1204 assigned to the computer device 1202 for at least temporarily storing data DAT and/or computer programs PRG, e.g. for controlling the operation of the THz apparatus 100 or at least one component thereof. In further preferred embodiments, the at least one computer program PRG can also be provided for controlling an in particular digital processing of data or signals of the THz apparatus 100, in particular by the data processing device 120, 1200.

The memory device 1204 preferably has a volatile memory, e.g. random access memory (RAM) 1204a and a non-volatile memory 1204b (e.g. Flash EEPROM).

In further preferred embodiments, the data processing device 120 has a data interface 1206 for data exchange with the digitisation stage 130, for example, via which the digital signal DS1 (FIG. 2) can be supplied to the data processing device 120, for example.

In further preferred embodiments, the first interface 140 can also be implemented by means of the data interface 1206, see the double-headed arrow 140a in FIG. 4.

Provision is made in further preferred embodiments that the digital data processing device 120, 1200 is designed to control operation of the THz apparatus 100 (FIG. 1) or of at least one component of the THz apparatus at least temporarily.

Provision is made in further preferred embodiments that the digital data processing device 120, 1200 and/or the THz apparatus 100 can be controlled at least temporarily by the at least one external unit 200 (FIG. 1). By way of example, for this purpose, the THz apparatus 100 or the data processing device 120, 1200 thereof can receive control commands from the external unit 200 via the first interface 140 at least temporarily.

Provision is made in further preferred embodiments that the digital data processing device 120, 1200 and/or the THz apparatus 100 can be operated autonomously at least temporarily, therefore in particular without the need for a (e.g. constant or at least temporary) control by a or the external unit 200 for example.

Provision is made in further preferred embodiments that the THz apparatus 100 and/or the digital data processing device 120, 1200 has at least one memory device 1204 (FIG. 4) for storing computer programs PRG and/or data DAT at least temporarily, wherein in particular the data DAT have at least one of the following elements: a) calibration data, in particular for at least one component 110 of the THz apparatus 100, b) model data characterising at least one component of the apparatus 100 or at least one model for a component of the THz apparatus 100.

In further preferred embodiments, characteristic calibration data (e.g. for position and/or distance sensitivity of optional THz optics 111 assigned to the THz element 110) and/or reference data (e.g. characterising an instrument profile and/or a reference pulse in optimal alignment or in one or more defined spatial positions of the THz apparatus 100) can be stored relative to a reference unit in the memory device 1204 of the THz apparatus 100 or the data processing device 120, 1200 thereof, and can be used there for a corresponding calibration or signal processing, for example.

In further preferred embodiments, transfer functions, for example, can be calculated in the frequency range and transferred to the external unit 200 by the data processing device 120, 1200, in particular alternatively/in addition to a transfer of the digital signals DS1, DS2, which e.g. characterise a temporal profile of THz radiation ZS2 detected by means of the THz element 110 or signals derived therefrom.

Provision is made in further preferred embodiments that the digital data processing device 120, 1200 is designed to carry out at least one of the following processes at least temporarily: a) background correction, b) pulse pileup correction, c) filtering, in particular pre-filtering, d) averaging, e) correction of THz data with reference measurements, f) providing a time-domain signal and/or frequency-domain signal, g) data, in particular characterising at least a part of the THz signals that are received and/or to be transmitted.

Provision is made in further preferred embodiments that the THz apparatus 100 and/or at least one component of the THz apparatus 100 is designed to transmit and/or receive at least one of the following signals via the first interface 140: a) clock signal, in particular for synchronisation with at least one external unit 200 or the at least one external unit 200, b) trigger signal (e.g. for triggering actions such as the generation of THz radiation TS1 or the detection of THz radiation TS2), c) data signal, in particular characterising at least a part of the THz signals that are received and/or to be transmitted.

Figure 5:
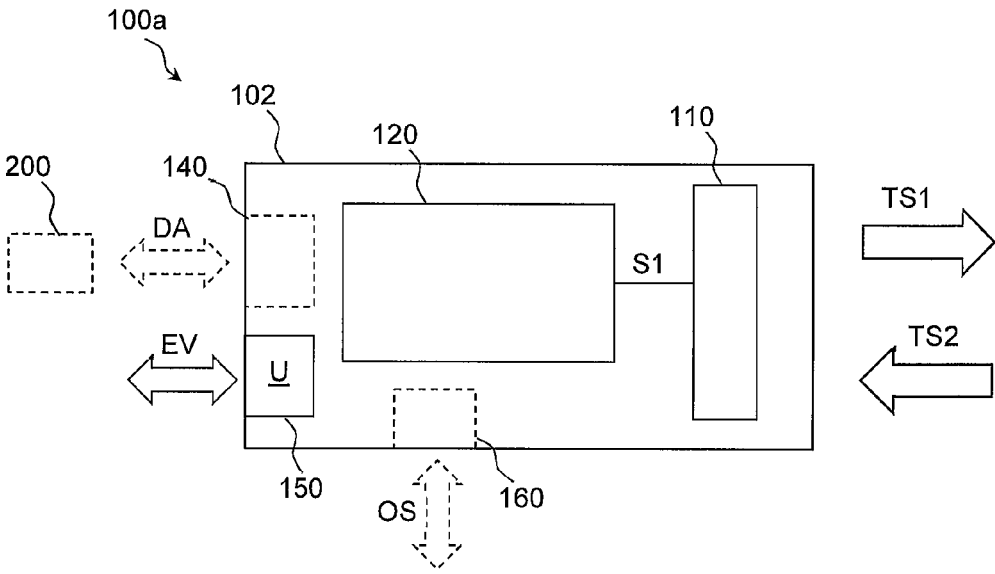

Provision is made in further preferred embodiments, cf. FIG. 5, that the THz apparatus 100a has at least one second interface 150 for the at least temporary, in particular electrical, energy supply EV of the THz apparatus 100a or at least one component of the THz apparatus 100a.

In further preferred embodiments, an electric operating voltage U can be provided for at least one component 120 of the THz apparatus 100a via the second interface 150, for example.

In further preferred embodiments, a bias voltage can be provided for the at least one element 110 via the second interface 150 for example.

In further preferred embodiments, the bias voltage for the at least one THz element 110 can also be generated locally in the THz apparatus 100, 100a, for example from the electric operating voltage U provided via the second interface 150. It is also conceivable in further preferred embodiments for a variable (thus can be altered dynamically, i.e. with respect to the run time of the THz apparatus 100, 100a) bias voltage to be provided (e.g. directly via the second interface 150 or locally in the THz apparatus 100, 100a, e.g. derived from the operating voltage U).

Provision is made in further preferred embodiments that the THz apparatus 100a (FIG. 5) has at least one third, in particular, optical, interface 160, for at least temporarily receiving optical radiation OS, in particular pulsed laser radiation, in particular from at least one external unit, for example from the external unit 200.

Provision is made in further preferred embodiments that the THz apparatus 100a is designed to receive at least two laser signals, that are at least temporarily different, via the third interface 160, e.g. from the external unit 200.

Figure 6:
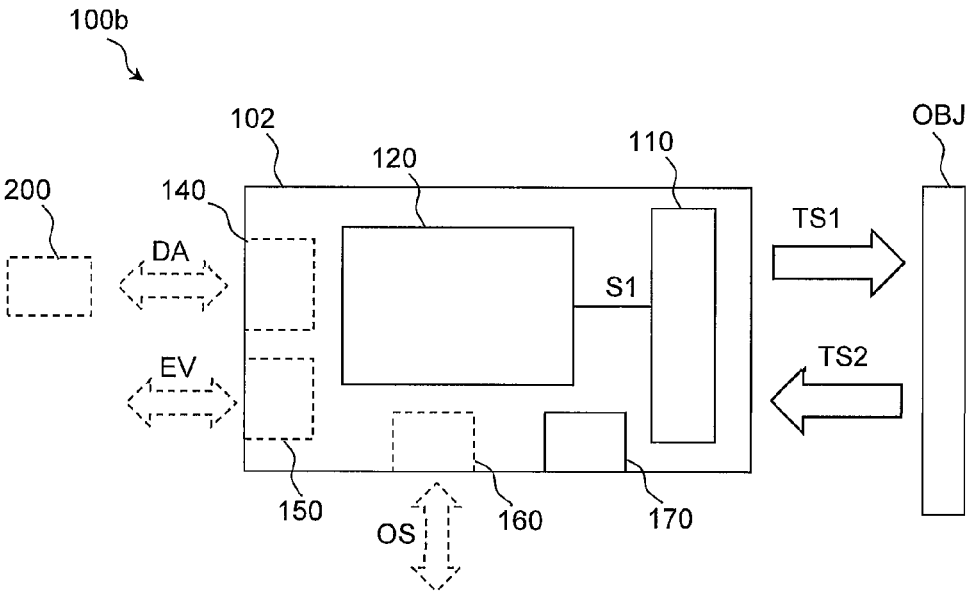

Provision is made in further preferred embodiments, cf. FIG. 6, that the THz apparatus 100b has at least one device 170 for determining a) a position of the THz apparatus 100b in space and/or b) a form of a measurement object OBJ and/or c) a distance between the THz apparatus 100b and a or the measurement object OBJ.

Provision is made in further preferred embodiments that the device 170 is designed to trigger a recording of the output signal AS (FIG. 2) or a transformation of the output signal AS into the digital signal DS1, in particular on the basis of a predefinable position and/or angular orientation of the THz apparatus 100b or of the measuring head 102 with respect to the measurement object OBJ. This thereby makes particularly precise THz measurement possible, because the detection of incoming THz radiation TS2 can e.g. be synchronised with a predefinable orientation of the measuring head 102, e.g. the device 170 can preferably be designed to trigger the analogue-to-digital converter 132 (FIG. 3).

In further preferred embodiments, an external trigger which triggers the device 170 and/or the analogue-to-digital converter 132 can alternatively or additionally be provided (trigger signal, e.g. transmitted by the external 200 via the first interface 140).

In further preferred embodiments, data recording or pick-up based on the received THz signal TS2 and determining position of the measuring head 102 are synchronised by the device 170.

Figure 7:
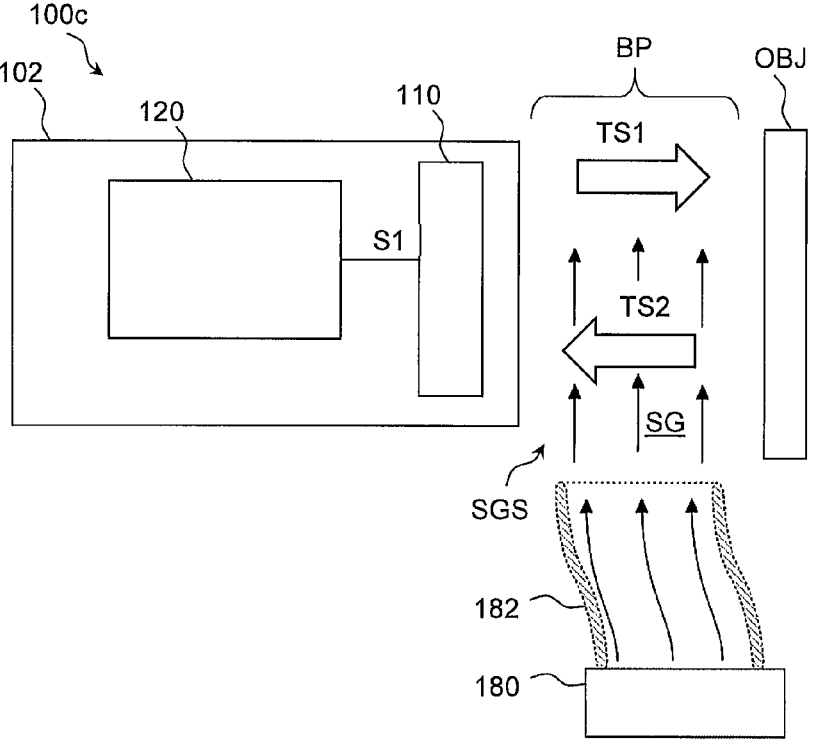

Provision is made in further preferred embodiments, cf. FIG. 7, that the THz apparatus 100c is designed to provide protective gas flow SGS having a protective gas SG in at least one region of a beam path BP of the THz radiation TS1, TS2, wherein in particular the protective gas SG has at least one of the following elements or is formed from at least one of the following elements: a) dry air, b) dry gas, c) dry gas mixture, d) at least one gas which has no absorption line in a frequency range of the THz radiation, wherein in particular the protective gas has a dew point temperature of –20 degrees Celsius or less, preferably of –30 degrees Celsius or less, more preferably of –40 degrees Celsius or less, wherein in particular the protective gas SG causes attenuation of the THz radiation TS1, TS2 along the beam path of 0.1 dB or less, preferably for each frequency of the THz radiation TS1, TS2.

Provision is made in further preferred embodiments that the THz apparatus 100c further has: a) at least one supply device 180 for at least temporarily providing the protective gas flow SGS, and/or b) at least one pressure influencing member (not shown) for influencing a pressure of the protective gas SG.

Provision is made in further preferred embodiments that the THz apparatus 100c further has: at least one nozzle 182, wherein in particular the nozzle 182 is designed and/or arranged to guide the protective gas flow SGS or at least a part of the protective gas flow SGS into the at least one region of the beam path BP of the THz radiation TS1, TS2, wherein in particular the at least one nozzle 182 is a free jet nozzle.

Figure 8:
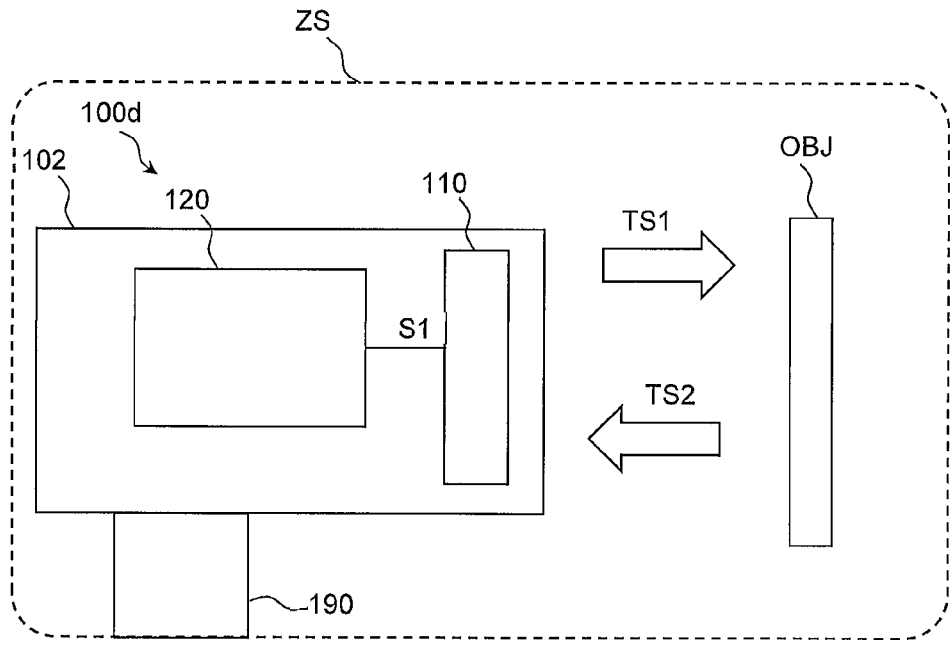

Provision is made in further preferred embodiments 100d, cf. FIG. 8, that the THz apparatus 100d has at least one positioning unit 190 which is designed to move the THz apparatus 100d at least temporarily a) relative to a or the measurement object OBJ and/or b) relative to a target system ZS (e.g. part of an (industrial) manufacturing facility) in which the THz apparatus 100d is arranged. In further preferred embodiments, the at least one positioning unit 190 can have, for example, at least one robot.

In further preferred embodiments, a robot 190 can also have or carry or position a plurality of apparatuses 100, 100a, 100b, 100c, 100d as per the embodiments.

Provision is made in further preferred embodiments that the THz apparatus is designed to carry out and/or enable a closed-loop positioning (i.e. in particular a controlled positioning in the sense of a closed control loop), in particular based on data of a or the device 170 for determining aa) a position of the THz apparatus in space and/or bb) a form of a measurement object and/or cc) a distance between the THz apparatus and a or the measurement object OBJ.

In further preferred embodiments, the data of the device 170 can for example be used based on this, e.g. with a certain tolerance, to bring a relative position of the measurement object OBJ into an area for which there is reference data, e.g. a source or the focal point of the THz radiation. As a result, the affected reference data can be used to improve future measurements.

Further preferred embodiments, cf. FIG. 9, relate to a control device 200 for at least temporarily controlling the operation of at least one THz apparatus for transmitting and/or receiving terahertz, THz, radiation, wherein in particular the at least one THz apparatus 100, 100a, 100b, 100c, 100d is designed according to preferred embodiments, wherein the control device 200 has at least one first, in particular digital, interface 210 for, in particular bidirectional, in particular real-time-capable, data exchange with at least a or the THz apparatus 100, 100a, 100b, 100c, 100d, wherein in particular the first interface 210 is wired or wireless.

In preferred embodiments, the first interface 210 of the control deice 200 can e.g. have a type comparable or identical to the first interface 140 of the THz apparatus 100.

Provision is made in further preferred embodiments that the control device 200 (FIG. 9) is designed to control operation of a plurality of THz apparatuses, simultaneously and/or at least partially temporally overlapping and/or in time multiplex, which apparatuses are denoted collectively with the reference sign 100' in FIG. 9 for the sake of clarity. In further preferred embodiments, at least one of the plurality of THz apparatuses 100' as per FIG. 9 can have a configuration 100, 100a, 100b, . . . as has been described above by way of example with reference to FIGS. 1 to 8.

Provision is made in further preferred embodiments that the control device 200 is designed to transmit, in particular to at least one THz apparatus 100', and/or receive at least one of the following signals via the first interface 210: a) clock signal CLK, b) trigger signal TRIG, c) data signal DS, in particular characterising at least a part of the THz signals to be transmitted, d) measurement data of a or the device 170 for determining aa) a position of the THz apparatus in space and/or bb) a form of a measurement object OBJ and/or cc) a distance between the THz apparatus and the measurement object OBJ.

Provision is made in further preferred embodiments that the control device 200 is designed to transmit control commands to at least one THz apparatus 100' at least temporarily, e.g. to control the operation of the at least one THz apparatus 100'. By way of example, the at least one THz apparatus 100' or the respective data processing device 120, 1200 thereof can receive the control commands from the external unit 200 via the first interface 140 at least temporarily and carry out its operation on the basis thereof.

Provision is made in further preferred embodiments, cf. FIG. 10, that the control device 200a has at least one second interface 220 which is an optical interface, in particular for at least temporarily outputting first pulsed laser radiation PL1 and/or second pulsed laser radiation PL2 to the at least one THz apparatus 100_1, 100_2, 100_3.

Provision is made in further preferred embodiments that the control device 200a has at least one laser device 230 for generating the first pulsed laser radiation PL1 with a first pulse frequency and for generating the second pulsed laser radiation PL2 with a second pulse frequency, wherein in particular the second pulse frequency is at least temporarily different from the first pulse frequency.

Provision is made in further preferred embodiments that the at least one laser device 230 has at least one, preferably two, pulsed laser sources 230a, 230b, in particular femtosecond, fs, pulsed laser sources 230a, 230b.

Provision is made in further preferred embodiments that the control device 200a is designed to output at least temporarily the first pulsed laser radiation PL1 and/or the second pulsed laser radiation PL2 to a plurality of THz apparatuses 100_1, 100_2, 100_3, in particular simultaneously or at least partially temporally overlapping or in time multiplex. As a result, operation of the plurality of THz apparatuses 100_1, 100_2, 100_3, in particular operation of the respective THz elements 110 thereof, e.g. detection of incoming THz radiation TS2 and/or transmitting THz radiation TS1 to be generated, can be controlled efficiently, in particular even synchronised with each other.

Provision is made in further preferred embodiments that the control device 200a has at least one optical beam splitter 220' and/or optical switch, in particular to supply one or a plurality of THz apparatuses 100_1, 100_2, 100_3 selectively with the first pulsed laser radiation PL1 and/or the second pulsed laser radiation PL2. In further preferred embodiments, a first (e.g. usable as THz transmitter) THz element of a THz apparatus can also be supplied with the first pulsed laser radiation PL1 at least temporarily via the second interface 220 or the beam splitter 220', e.g. in order to generate corresponding THz pulses TS1, and a second (e.g. usable as THz detector) THz element of the same THz apparatus can be supplied with the second pulsed laser radiation PL2 at least temporarily via the second interface 220 or the beam splitter 220', e.g. in order to enable or trigger detection of incoming THz pulses TS2.

Provision is made in further preferred embodiments that the optical beam splitter 220' and/or optical switch is wavelength-neutral.

Provision is made in further preferred embodiments that the optical beam splitter 220' and/or the optical switch has a maximum attenuation of 1.0 dB, in particular 0.2 dB in a wavelength range between 1450 nm (nanometres) and 1650 nm, more particularly in a wavelength range between 1500 nm and 1600 nm.

Provision is made in further preferred embodiments that the optical beam splitter 220' and/or the optical switch is/are designed so that at least 80 percent of the total power of the (first and/or second pulsed) laser radiation PL1, PL2 is transmitted in a wavelength range of +/−100 nm around a central wavelength (in particular between +/−50 nm with respect to the central wavelength range) of the laser radiation PL1, PL2.

Provision is made in further preferred embodiments that a plurality of fibre optics devices 240 (symbolised in FIG. 10 for the sake of clarity with dashed arrows) are provided to supply a plurality of THz apparatuses 100_1, 100_2, 100_3 with the first pulsed laser radiation and/or the second pulsed laser radiation in each case.

Provision is made in further preferred embodiments that some, preferably each, of the plurality of fibre optics devices 240 are dispersion-matched and/or length-matched to a maximum optical path length difference of +/−6 cm, in particular +/−3 cm. This makes particularly efficient operation possible with respect to the THz signals. Provision is made in further preferred embodiments that the at least one laser device 230 has at least one, preferably two, continuous wave (CW) laser sources or quasi-continuous-wave (QCW) laser sources, as a result of which processes based on the principle of frequency domain spectroscopy can be carried out, for example.

Provision is made in further preferred embodiments that the control device 200a has at least one third interface 250 for the at least temporary electrical energy supply EV (see also FIG. 5) of at least one component of the at least one THz apparatus.

Provision is made in further preferred embodiments that the control device 200a has at least one fourth interface 260 for, in particular bidirectional, data exchange with at least one (in particular further) external component 10, for example a control computer.

Provision is made in further preferred embodiments that the control device 200a has at least one digital signal processing device (e.g. a DSP) 270, wherein in particular the at least one digital signal processing device 270 is designed to process at least one signal received by the at least one THz apparatus 100_1, 100_2, 100_3.

In further preferred embodiments, the signal processing device 270 can have, for example, a structure and/or functionality that is essentially similar or identical to the configuration 1200 as per FIG. 4.

Further preferred embodiments, cf. FIG. 11, relate to a system 1000 having at least one THz apparatus 100e as per the embodiments and having at least one control device 200b as per the embodiments. The THz apparatus 100e has a first THz element has 110_1 that is designed to transmit THz radiation TS1 and a second THz element 110_2 that is designed to receive THz radiation TS2. By way of example, the second THz element 110_2 can receive that THz radiation TS2 that has been transmitted from the first THz element 110_1, in particular on a measurement object, and reflected at the measurement object.

The control device 200b has a first pulsed laser source 230a that generates a first laser signal s10a and a second pulsed laser source 230b that generates a second laser signal s10b. The first laser signal s10a can be used, e.g. in the first THz element 110_1, to generate THz radiation TS1 to be transmitted, for example by an impinging, known per se, on a switch made of photoconductive material, and the second laser signal s10b can be used, e.g. in the second THz element 110_2, to detect received THz radiation TS2, for example by an impinging, known per se, on a THz detector made of photoconductive material.

A part of the respective laser signals s10a, s10b is coupled out by beam splitters 231a, 231b and supplied to an optoelectronic detector 232a, 232b (e.g. photodiode(s)), which outputs corresponding electrical signals s11a, s11b to a phase detector 233. A combiner 235 (in particular adder) combines an output signal of the phase detector 233 that characterises a phase difference between the laser signals s10a, s10b with an output signal of a function generator 234, and the output signal of the combiner 235 is supplied to a controller, in particular PID controller 236, which forms a control signal s12 on the basis of the output signal of the combiner 235 and outputs it to the second pulsed laser source 230b, as a result of which e.g. an oscillator length of the second pulsed laser source 230b can be influenced, e.g. by means of a piezoelectric actuator (not shown) which is controlled with the control signal s12. If necessary, an optional amplifier (likewise not shown) can be provided, which provides the control signal s12 in a voltage range required for the piezoelectric actuator (e.g. a few tens of volts or more).

As a result, a phase of the second laser signal s10b can be specified, in particular adjusted, in relation to the first laser signal s10a. Further preferably, this can be achieved for example by specifying a corresponding output signal of the function generator 234 (e.g. sawtooth wave or triangle wave).

THz radiation TS2 detected by the second THz element 110_2 or an electrical signal characterising the detected THz radiation TS2 can be further processed, for example, by the digitisation stage 130', wherein the digitisation stage 130' can have, for example, the same design as the digitisation stage 130 as per FIG. 3.

A digital output signal DA of the digitisation stage 130' can be supplied to control device 200b in further preferred embodiments of the digital signal processing device 270', for example for further processing.

The control device 200b can optionally have an electrical supply device 237 that is designed to provide a bias voltage U_B for at least the first THz element 100_1 at least temporarily.

In further preferred embodiments, an interface between the control device 200b and the THz apparatus 100e can have at least one of the following elements: at least one light guide device (not shown in FIG. 11) for transferring first and/or second laser signals s10a, s10b to the THz apparatus 100e, b) at least one digital data interface for the digital exchange of data DA between the THz apparatus 100e and the control device 200b, c) at least one interface for the electrical energy supply (e.g. bias voltage), wherein in further preferred embodiments, a plurality of the interfaces can be combined with each other, e.g. the interfaces as per aspect b), c). By way of example, in further preferred embodiments, for example a PoE (Power over Ethernet)-capable Ethernet interface can also be used to combine the at least one digital data interface and the at least one interface for the electrical energy supply.

FIG. 12 schematically shows a block diagram of a system 1000a as per further preferred embodiments. A control device 200c that is designed in a similar or identical manner to the control device 200 as per FIG. 10 has, in the present case for example, three THz apparatuses assigned 100_1, 100_2, 100_3 to it, which are each connected, preferably optically and electrically, to the control device 200c via a supply line 280_1, 280_2, 280_3.

FIG. 13A schematically shows a part of a supply line 280 as per further preferred embodiments. By way of example, in further preferred embodiments, at least one of the supply lines 280_1, 280_2, 280_3 can have the configuration as per FIG. 13A.

The supply line 280 has at least one light guide device 240, e.g. to supply the THz apparatus 100 with laser radiation or laser signals, in particular with the first pulsed laser radiation PL1 and/or with the second pulsed laser radiation PL2.

By way of example, the at least one light guide device 240, see also FIG. 13B, can have a first optical fibre 241 to supply a THz apparatus 100 with the first pulsed laser radiation PL1 (see e.g. also signal S10a as per FIG. 11), and a second optical fibre 242 to supply a THz apparatus 100 with the second pulsed laser radiation PL2 (see e.g. also signal S10b as per FIG. 11).

The supply line 280 as per FIG. 13A further has at least one data line 281 to transfer data between the preferably digital interface 210 of he control device 200 and the preferably digital interface 140 of the THz apparatus 100. In further preferred embodiments, the data line 281 can additionally also be used to transfer data to the electrical energy supply, e.g. the THz apparatus 100 by the control device 200 (or vice versa).

In further preferred embodiments, the supply line 280 as per FIG. 13A can also have an optional further electrical conductor device 282, which for example is designed for the electrical energy supply of at least one component of the THz apparatus 100 by the control device 200.

In some preferred embodiments, a safety extra-low voltage (e.g. 12 volts or 24 volts or the like) can be provided by means of the optional conductor device 282 by way of example for the operation of at least some components 120, 130, 140 of the THz apparatus 100, e.g. by the control device 200. In further preferred embodiments, the THz apparatus 100 can be designed to locally generate a bias voltage U_B for at least one THz element 110_1, 110_2 on the basis of the safety extra-low voltage provided by means of the conductor device 282.

In further preferred embodiments, the conductor device 282 can also be designed to supply the THz apparatus 100 with multiple different voltages, e.g. with a safety extra-low voltage (e.g. 12 volts or 24 volts or the like) for the operation of at least some components 120, 130, 140 of the THz apparatus 100, and with the bias voltage U_B for the at least one THz element 110_1, 110_2. In these embodiments, both the safety extra-low voltage and the bias voltage can be generated or provided respectively for example by means of the control device 200, and be supplied to the at least one THz apparatus 100; 100_1, 100_2, 100_3 via the supply line 280 or the conductor device 282 thereof.

FIG. 14 schematically shows a block diagram as per further preferred embodiments. Aspects of the optical interface 220 (FIG. 10) of the control device 200 are depicted by way of example. In particular, FIG. 14 shows the two pulsed laser sources 230a, 230b, see also FIG. 10, 11, as well as optical distributers 222a, 222b which distribute pulsed laser radiation PL1 or PL2, supplied in each case by means of the two pulsed laser sources 230a, 230b, to a plurality of optical fibres 241a, 241b, . . . , 242a, 242b, . . . . By way of example, the distributers 222a, 222b are designed as fibre optic couplers or beam splitters or switches.

For example, the distributer 222a distributes pulsed laser radiation PL1 provided by the pulsed laser source 230a to the optical fibres 241a, 241b and possibly further optical fibres (symbolised in FIG. 14 by means of three points " . . . " for the sake of clarity), for example to forward the (portions of the) pulsed laser radiation PL1 to different THz apparatuses 100_1, 100_2, . . . . The same applies for the distributer 222b.

In further preferred embodiments, the distributers 222a, 222b are integrated in the control device 200. In further preferred embodiments, the distributers 222a, 222b can also be arranged externally in relation to the control device 200.

In further preferred embodiments, the fibres 241a, 242a are assigned to the first supply line 280_1 and the fibres 241b, 242b to the second supply line 280_2, etc. Any other electrical or data lines 281, 282 of the respective supply line 280_1, 280_2 that may be present are likewise not depicted in FIG. 14 for the sake of clarity.

In further preferred embodiments, the supply lines 280; 280_1, 280_2, 280_3 can be at least one metre (m), in particular at least 15 m in length, preferably longer than 20 m. As a result, one or more of the THz apparatuses 100_1, 100_2, 100_3 can advantageously be arranged at least temporarily spatially offset from the control device 200 or deployed in an almost mobile way, for example be positioned by means of a positioning system such as at least one robot, e.g. relative to at least one measurement object.

In further preferred embodiments, the optical fibres 241a, 242a, in particular the optical fibres 241a, 242a respectively assigned to the same THz apparatus 100_1, are designed so that they have at least approximately the same-sized attenuation for the laser radiation PL1, PL2, which in further preferred embodiments is less than or equal to 0.3 dB. Particularly preferably, the entire optical path between the THz apparatus 100_1 and the laser sources 230a, 230b, therefore in particular including the distributers 222a, 222b, has an attenuation of less than or equal to 0.3 dB.

In further preferred embodiments, the two optical paths (100_1, 241a, 222a, 230a), (100_1, 242a, 222b, 230b) have a maximum optical path difference between the THz apparatus 100_1 and a corresponding laser source 230a, 230b of +−6 centimetres (cm), preferably +−3 cm, in particular +−1 cm. Particularly precise THz-based measurements are thereby made possible.

The optical fibres 241a, 241b, . . . , 242a, 242b, . . . are particularly preferably polarisation-maintaining (PM) fibres.

In further preferred embodiments, using the configuration depicted schematically in FIG. 14, a multiplicity of THz apparatuses 100_1, 100_2, . . . can be supplied by means of a control device 200 flexibly (and also in particular over longer paths of a few metres up to some tens of metres or more) with pulsed laser radiation PL1, PL2 (and preferably also with electrical signals for a bidirectional data exchange and/or electrical energy supply), as a result of which correspondingly flexible measurement configurations result with a multiplicity of THz apparatuses. This is depicted schematically in FIG. 15.

FIG. 15 shows a system 1000b as per further preferred embodiments. A control device 200, which has, e.g., the configuration as per FIG. 10 (or similar), supplies a first THz apparatus 100_1 via a first supply line 280_1 with pulsed laser radiation PL1, PL2 and electrical energy for the operation of the first THz apparatus 100_1. A bidirectional data connection between the control device 200 and the first THz apparatus 100_1 is additionally realised by means of the supply line 280_1, in particular to transmit time- and value-discrete data, which e.g. characterises THz radiation detected by means of the first THz apparatus 100_1 (or data derived therefrom, e.g. digitally pre-processed (e.g. filtering, etc.) data). The further THz apparatuses 100_2, 100_3 are connected to the control device 200 in a comparable way, specifically via the supply lines 280_2, 280_3.

A positioning system 190a, 190b is assigned to each of the THz apparatuses 100_1, 100_2, which system can be a robot for example, e.g. an (industrial) robot with three or more degrees of freedom, e.g. with six degrees of freedom. In this way, flexible, almost mobile THz measurements can be carried out on the measurement object OBJ by means of the THz apparatuses 100_1, 100_2. By contrast, the third THz apparatus 100_3 is designed to be stationary for example, in particular arranged on a structure (wall and/or ceiling) not depicted in FIG. 15.

All each of the three THz apparatuses 100_1, 100_2, 100_3 can carry out THz-based measurements with respect e.g. to the measurement object OBJ, preferably under the control of the control device 200. To this end, for example, the THz apparatuses 100_1, 100_2, 100_3 can apply THz radiation TS12_1, TS12_2, TS12_3, generated locally in the respective THz apparatus, to the measurement object OBJ and receive or detect portions of the THz radiation TS12_1, TS12_2, TS12_3 reflected at the measurement object OBJ.

The transmission and/or reception or detection can be carried out, for example, in each case by applying the pulsed laser radiation PL1, PL2 to corresponding THz elements 110 (FIG. 1) of the THz apparatuses 100_1, 100_2, 100_3.

In further preferred embodiments, the control device 200 can operate at least two THz apparatuses 100_1, 100_2 synchronously with each other, e.g. simultaneously trigger or initiate THz-based measurements by the two THz apparatuses 100_1, 100_2, e.g. by providing a common trigger signal TRIG (FIG. 9) to the two THz apparatuses 100_1, 100_2 via the digital data interface and/or a synchronised application of the pulsed laser radiation PL1, PL2 to the THz apparatuses 100_1, 100_2 or their respective THz elements 110.

In further preferred embodiments, the control device 200 can operate at least two THz apparatuses 100_1, 100_2 asynchronously with each other, e.g. trigger or initiate, by the two THz apparatuses 100_1, 100_2, THz-based measurements that are temporally offset or temporally independent.

FIG. 15 shows a system 1000b as per further preferred embodiments. A control device 200d, which has, e.g., the configuration as per FIG. 10 (or similar), supplies a first THz apparatus 100_1 via a first supply line 280_1 with pulsed laser radiation PL1, PL2 and electrical energy for the operation of the first THz apparatus 100_1. A second THz apparatus 100_2 is connected via a second supply line 280_2 to the first THz apparatus 100_1 which supplies the second THz apparatus 100_2 via the second supply line 280_2 with pulsed laser radiation PL1, PL2 and electrical energy for the operation of the second THz apparatus 100_2. A third THz apparatus 100_3 is connected via a third supply line 280_3 to the second THz apparatus 100_2 which supplies the third THz apparatus 100_3 via the third supply line 280_3 with pulsed laser radiation PL1, PL2 and electrical energy for the operation of the third THz apparatus 100_3.

A type of daisy chain connection of the plurality of THz apparatuses 100_1, 100_2, 100_3 is thereby advantageously realised, which likewise advantageously makes possible a distributed, almost mobile use of the plurality of THz apparatuses 100_1, 100_2, 100_3. In further preferred embodiments, more than the three THz apparatuses depicted by way of example can also be connected to each other in this way.

In further preferred embodiments, the THz apparatus 100_1 as per FIG. 16 can have an optical interface 160 (FIG. 5) for receiving the pulsed laser radiation PL1, PL2 via the first supply line 280_1, which for example has a beam splitter or coupler (e.g. like the distributer 222a as per FIG. 14) via which a part of the pulsed laser radiation PL1, PL2 can be coupled out for the operation of the first THz apparatus 100_1, and via which a further part of the pulsed laser radiation PL1, PL2 can be forwarded via the supply line 280_2 for the operation of the further THz apparatuses 100_2, 100_3. The equivalent can apply in further preferred embodiments for the electrical energy supply and/or the preferably bidirectional digital data connection between the further THz apparatuses 100_2, 100_3 or with the control device 200 in each case.

Further preferred embodiments, cf. FIG. 17, relate to a method for operating a terahertz, THz, apparatus 100 (FIG. 1) for transmitting and/or receiving terahertz, THz, radiation TS1, TS2, having at least one THz element 110, which is designed to transmit and/or receive the THz radiation TS1, TS2, and a digital data processing device 120, wherein the digital data processing device 120 processes 302 at least temporarily at least one first signal S1 of at least one component 110 of the THz apparatus 100. Optionally, prior to the processing 302, a THz signal TS2 can be received or detected 300. Optionally, after the processing 302, processed data can be transmitted 304 from the THz apparatus 100 to the control device 200 (FIG. 9) for example, in particular via the digital data interface. In this case, time- and value-discrete data or signals characterised by time- and value-discrete data can preferably be transferred.

In further preferred embodiments, cf. FIG. 18, the THz apparatus 100 (FIG. 1) receives (step 310) configuration data from the control device 200, and in step 312, the THz apparatus 100 is operated on the basis of the received configuration data.

Further preferred embodiments, cf. FIG. 19, relate to a method for operating a control device 200 for at least temporarily controlling the operation of at least one THz apparatus 100 for transmitting and/or receiving terahertz, THz, radiation wherein in particular the at least one THz apparatus is designed as per the embodiments, wherein the control device 200 has at least one first, in particular digital, interface 210 for, in particular bidirectional, data exchange with at least a or the THz apparatus 100, wherein in particular the first interface 210 is wired or wireless, and wherein the control device 200 exchanges 350 data at least temporarily with the at least one THz apparatus, preferably with a plurality of THz apparatuses 100_1, 100_2, 100_3 (FIG. 12, 15, 16), in particular to control the at least one THz apparatus or the plurality of THz apparatuses. In a subsequent step 352, the control device 200 receives preferably digital data characterising, for example, at least one detected THz signal from at least one of the plurality of THz apparatuses 100_1, 100_2, 100_3.

Provision is made in further preferred embodiments, cf. FIG. 20, that the control device 200 operates 360 at least two THz apparatuses 100_1, 100_2 in synchronised fashion at least temporarily, and/or that the control device 200 operates 362 at least two THz apparatuses 100_1, 100_2 in asynchronised fashion at least temporarily. In further preferred embodiments, operation of a plurality of THz apparatuses exclusively in synchronised fashion or asynchronised fashion is also possible.

Further preferred embodiments, cf. FIG. 21, relate to the use 400 of the THz apparatus 100; 100_1, 100_2, 100_3 as per the embodiments and/or of the control device 200 as per the embodiments and/or of the system 1000, 1000a, 1000b, 1000c as per the embodiments and/or of the method as per the embodiments for at least one of the following aspects: a) carrying out 402 a plurality of THz measurements in simultaneous and/or temporally offset and/or temporally alternating fashion, in particular with respect to at least one measurement object OBJ, b) carrying out 404 a signal processing or pre-processing of signals S1, AS, DS1 associated with at least one THz signal TS2, in particular by at least one THz apparatus 100 and/or by the at least one control device 200, c) centrally controlling 406 a plurality of THz apparatuses 100_1, 100_2, 100_3 (FIG. 10) by means of the at least one control device 200, d) carrying out 408 an, in particular model-based, layer thickness measurement on at least one measurement object OBJ using at least one, preferably a plurality of, THz apparatuses 100_1, 100_2, 100_3, using in particular protective gas SG at least temporarily, in particular within a manufacturing line ("in-line") e.g. of an industrial manufacturing facility, and/or positioning 408 a plurality of THz apparatuses 100; 100_1, 100_2, 100_3 under the control of the at least one control device 200, in particular by means of at least one positioning unit 190; 190a, 190b (FIG. 15), carrying out closed-loop positioning, in particular based on data of an or the device 170 for determining aa) a position of the THz apparatus in space and/or bb) a form of a measurement object OBJ and/or cc) a distance between the THz apparatus and a or the measurement object OBJ measuring, in particular model-based measuring, layer thicknesses of a plurality of layers situated on top of one another, in particular lacquer layers, wherein in particular at least one of the layers is wet (i.e. in particular not yet dry), f2) measuring, in particular model-based measuring, layer thicknesses of a plurality of layers situated on top of one another, in particular lacquer layers, wherein in particular at least one of the layers is dry.

The invention claimed is:

1. System having at least one THz apparatus and at least one external control device, wherein the at least one THz apparatus is provided for transmitting and receiving THz radiation, comprising at least one THz element which is designed to transmit and/or receive the THz radiation, wherein the at least one THz element, which is designed to detect at least one THz signal and to output an output signal, which characterizes the detected at least one THz signal, and wherein the at least one THz apparatus has a digitization stage which is designed to transform the output signal of the at least one THz element into a first digital signal and a digital data processing device, wherein the digital data processing device is designed to process at least temporarily at least one first signal of at least one THz element of the apparatus, wherein the THz apparatus has at least one first digital interface for a bidirectional data exchange with the at least one external control device, wherein the THz apparatus has at least one second interface for the at least temporary electrical, energy supply of the THz apparatus, and wherein the THz apparatus is designed to receive at least two signals, that are at least temporarily different, via a third interface of the at least one external control device, wherein the at least one external control device comprises at least one digital interface for a bidirectional data exchange with the at least one THz apparatus via a digital interface of the at least one THz apparatus, wherein the at least one second interface of the at least one external control device is provided for at least temporarily transmitting a first laser radiation and/or a second laser radiation to the at least one THz apparatus, and wherein the at least one external control device is designed to control at least temporarily operation of the at least one THz apparatus.

2. System according to claim 1, wherein the digitisation stage has an analogue-to-digital converter and at least one amplifier, and/or wherein the digital data processing device has at least one of the following elements: a) microprocessor, b) microcontroller, c) programmable logic module, d) digital signal processor, e) graphics processor, f) application-specific integrated circuit.

3. System according to claim 1, wherein the digital data processing device is designed to control an operation of the THz apparatus or of at least one component of the THz apparatus at least temporarily.

4. System according to claim 1, wherein the digital data processing device and/or the THz apparatus can be controlled at least temporarily by at least one external unit.

5. System according to claim 1, wherein the digital data processing device and/or the THz apparatus can be operated autonomously at least temporarily.

6. System according to claim 1, wherein the THz apparatus and/or the digital data processing device has at least one memory device for at least temporarily storing computer programs and/or data, wherein the data have at least one of the following elements: a) calibration data for at least one component of the THz apparatus, b) model data characterising at least one component of the apparatus or at least one model for a component of the THz apparatus, c) data of reference measurements, d) data characterising at least a part of the THz signals that are received and/or to be transmitted.

7. System according to claim 1, wherein the digital data processing device is designed to carry out at least one of the following processes at least temporarily: a) background correction, b) pulse pileup correction, c) filtering, d) averaging, e) correction of THz data with reference measurements, f) providing a time-domain signal and/or frequency-domain signal, g) data characterising at least a part of the THz signals that are received and/or to be transmitted.

8. System according to claim 1, wherein the THz apparatus and/or at least one component of the THz apparatus is designed to transmit and/or receive at least one of the following signals via the first interface: a) clock signal, for synchronisation with at least one external unit or the at least one external unit, b) trigger signal, c) data signal, characterising at least a part of the THz signals that are received and/or to be transmitted, d) measurement data of a device for determining aa) a position of the THz apparatus in space and/or bb) a form of a measurement object and/or cc) a distance between the THz apparatus and a or the measurement object.

9. System according to claim 1, wherein the first interface is designed for bidirectional real-time communication.

10. System according to claim 1, wherein the at least one third interface is an optical interface for at least temporarily receiving optical radiation from at least one external unit.

11. System according to claim 1, wherein the THz apparatus has at least one device for determining a) a position of the THz apparatus in space and/or b) a form of a measurement object and/or c) a distance between the THz apparatus and a or the measurement object.

12. System according to claim 11, wherein the THz apparatus has at least one positioning unit which is designed to move the THz apparatus at least temporarily a) relative to a or the measurement object and/or b) relative to a target system in which the THz apparatus is arranged.

13. System according to claim 12, wherein the THz apparatus is designed to carry out and/or enable a closed-loop positioning based on data of a or the device for determining aa) a position of the THz apparatus in space and/or bb) a form of a measurement object and/or cc) a distance between the THz apparatus and a or the measurement object.

14. System according to claim 1, wherein the first interface is wired or wireless and/or the control device is designed to control operation of a plurality of THz apparatuses simultaneously and/or at least partially temporally overlapping and/or in time multiplex.

15. System according to claim 1, wherein the control device is designed to transmit and/or receive at least one of the following signals via the first interface: a) clock signal, b) trigger signal, c) data signal, characterising at least a part of the THz signals received and/or to be transmitted, d) measurement data of a or the device for determining aa) a position of the THz apparatus in space and/or bb) a form of a measurement object and/or cc) a distance between the THz apparatus and a or the measurement object.

16. System according to claim 1, wherein the second interface is an optical interface.

17. System according to claim 1, wherein the control device has at least one laser device for generating the first pulsed laser radiation with a first pulse frequency and for generating the second pulsed laser radiation with a second pulse frequency.

18. System according to claim 17, wherein the at least one laser device has at least one pulsed laser source.

19. System according to claim 17, wherein the second pulse frequency is at least temporarily different from the first pulse frequency.

20. System according to claim 1, wherein the control device is designed to output at least temporarily the first pulsed laser radiation and/or the second pulsed laser radiation to a plurality of THz apparatuses, simultaneously or at least partially temporally overlapping or in time multiplex.

21. System according to claim 1, wherein the control device has at least one optical beam splitter and/or optical switch to supply one or a plurality of THz apparatuses selectively with the first pulsed laser radiation and/or the second pulsed laser radiation, wherein the optical beam splitter and/or optical switch is wavelength-neutral in a wavelength range between 1450 nm and 1650 nm, has a maximum attenuation of 1.0 dB, and/or wherein the optical beam splitter and/or optical switch is/are designed so that at least 80 percent, of the total power of the laser radiation is transmitted in a wavelength range of +/−100 nm around a central wavelength of the laser radiation.

22. System according to at least claim 1, wherein a plurality of fibre optics devices are provided to supply a plurality of THz apparatuses with the first pulsed laser radiation and/or the second pulsed laser radiation, wherein some, or each, of the plurality of light guide devices are dispersion-matched and/or length-matched to a maximum optical path length difference of +/−6 cm.

23. System according to claim 1, wherein the control device has at least one third interface for the at least temporary electrical energy supply of at least one component of the at least one THz apparatus, and/or wherein the control device has at least one fourth interface for bidirectional data exchange with at least one external component.

24. Control device according to claim 1, wherein the control device has at least one digital signal processing device, wherein the at least one digital signal processing device is designed to process at least one signal received by the at least one THz apparatus.

25. Method for operating a system for at least temporarily controlling the operation of at least one THz apparatus according to claim 1 for transmitting and receiving THz radiation with at least one THz element, which is designed to transmit and/or receive the THz radiation and with a data processing device, which is designed to process at least one first signal of at least one component of the THz apparatus, wherein the control device comprises at least one digital interface for a bidirectional data exchange with the at least one THz apparatus via a digital interface and wherein the second interface is provided for at least temporarily transmitting a first pulsed laser radiation and/or a second pulsed laser radiation to the at least one THz apparatus, wherein the data processing device is a digital data processing device that processes at least temporarily at least one first signal of at least one component of the THz apparatus, wherein the control device has at least one first digital interface for bidirectional data exchange with the at least one THz apparatus, and wherein the control device exchanges data at least temporarily with the at least one THz apparatus to control the plurality of THz apparatuses.

26. Method according to claim 25 comprising the following: a) carrying out a plurality of THz measurements in simultaneous and/or temporally offset and/or temporally alternating fashion, with respect to at least one measurement object, b) carrying out a signal processing or pre-processing of signals associated with the at least one THz signal, and/or by the at least one control device, c) centrally controlling a plurality of THz apparatuses by means of the at least one control device, d) positioning a plurality of THz apparatuses under the control of the at least one control device, by means of at least one positioning unit, e) carrying out closed-loop positioning, based on data of an or the device for determining aa) a position of the THz apparatus in space and/or bb) a form of a measurement object and/or cc) a distance between the THz apparatus and a or the measurement object, f1) model-based measuring, layer thicknesses of a plurality of layers situated on top of one another wherein at least one of the layers is wet or is dry.

* * * * *